No. 825,384. PATENTED JULY 10, 1906.
C. A. FISHER.
CLUTCH.
APPLICATION FILED MAR. 12, 1904.
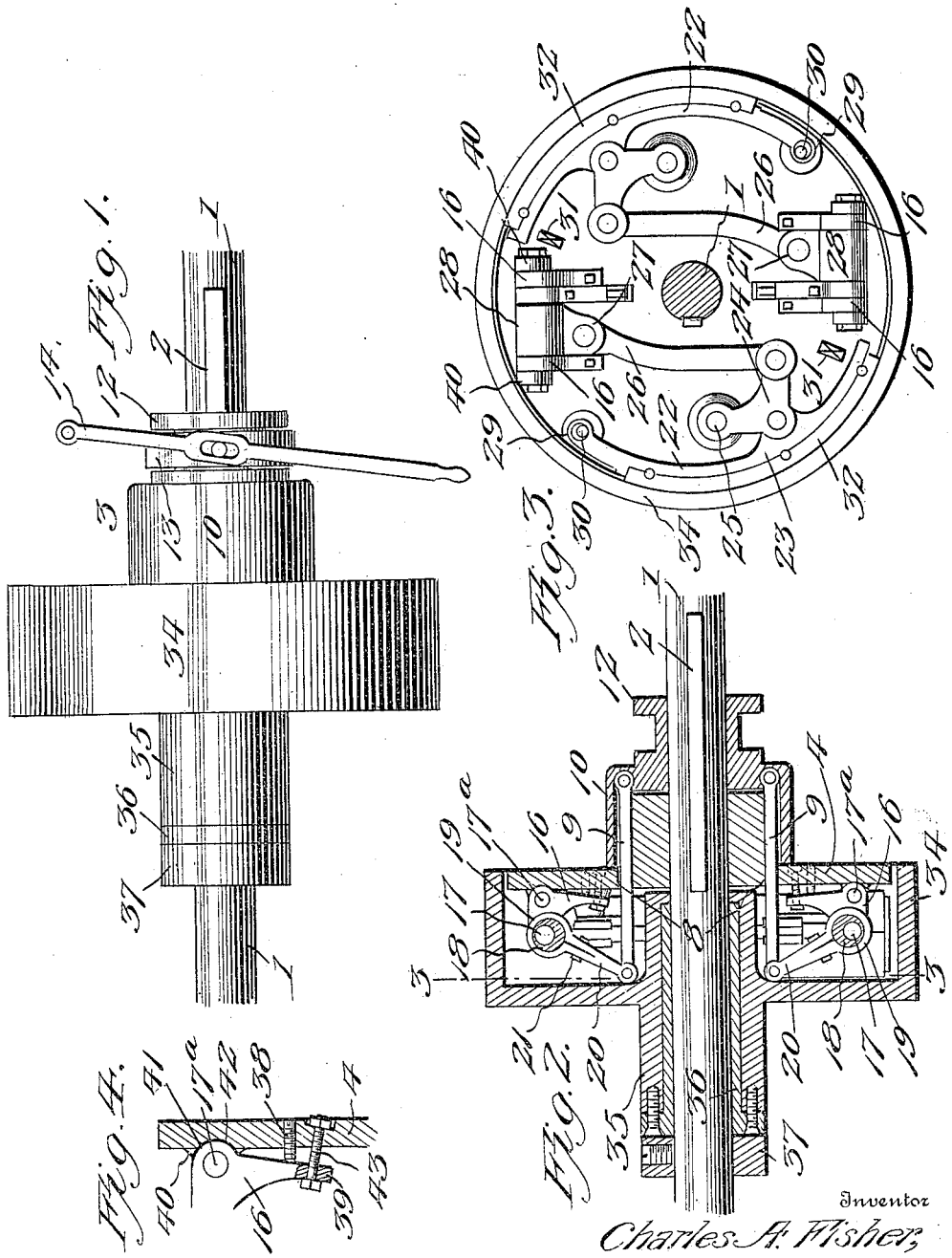
Inventor
Charles A. Fisher,
By Victor J. Evans
Attorney
Witnesses
Wm. Koerth,
Chas. S. Hyer

UNITED STATES PATENT OFFICE.

CHARLES A. FISHER, OF NIAGARA FALLS, NEW YORK, ASSIGNOR OF SEVENTY-THREE ONE-HUNDREDTHS TO LOUIS SILVERBURG, OF NIAGARA FALLS, NEW YORK, AND CURT C. ANDRUS, OF NORTH TONAWANDA, NEW YORK.

CLUTCH.

No. 825,384.  Specification of Letters Patent.  Patented July 10, 1906.

Application filed March 12, 1904. Serial No. 197,861.

*To all whom it may concern:*

Be it known that I, CHARLES A. FISHER, a citizen of the United States, residing at Niagara Falls, in the county of Niagara and State of New York, have invented new and useful Improvements in Clutches, of which the following is a specification.

This invention relates to a clutch; and the primary object of the same is to provide a device of this class having a simple and effective organization of coöperating elements of a strong and durable nature arranged to overcome disadvantages resident in many similar devices now in use.

A further object of the invention is to provide a clutch organization wherein the shoes carried by one member to engage a portion of a companion member will be positively applied to set up a frictional connection between the two members in such manner as to reduce wear on the shoes to a minimum.

A further object of the invention is to provide a clutch wherein the shoes for frictionally connecting the members thereof have a positive adjustment to compensate for wear and also capable of being maintained in immovable withdrawn position to obviate pounding and injury to the parts thereof and render the clutch as an entirety practically noiseless when the parts thereof are running loose.

A still further object of the invention is to provide a clutch wherein the parts may be readily associated or assembled in operative relation.

With these and other objects and advantages in view the invention consists in the construction and arrangement of parts, which will be more fully hereinafter set forth and subject to a wide range in modification in the form, proportions, dimensions, and minor details within the scope of the invention.

In the drawings, Figure 1 is a side elevation of a clutch embodying the features of the invention. Fig. 2 is a longitudinal vertical section thereof. Fig. 3 is a transverse vertical section on the line 3 3, Fig. 2. Fig. 4 is a detail sectional view showing the adjusting means for compensating for wear on the shoes.

Similar numerals of reference are employed to indicate corresponding parts in the several views.

Referring to Figs. 1, 2, 3, and 4, the numeral 1 designates a shaft from which power is adapted to be transmitted, or it may be a sectional shaft arranged to be coupled through the use of the improved clutch. The shaft is provided with a longitudinal spline or feather 2 to hold a locking member 3 in rotative connection therewith. This locking member consists of a disk 4, projecting outwardly from one end of a hub 5, having a suitable groove to receive a portion of the spline or feather 2, and also provided with outer longitudinally-disposed grooves or slots 7, coinciding with openings 8 through the disk to accommodate the assemblage and operation of shifting links 9, attached to a sleeve 10, having a hollow or chambered end 11 to telescope over and receive the hub 5. The outer end of the sleeve 10 is reduced and circumferentially grooved to form a coupling-head 12, to which is applied a collar 13, engaged by a shifting-lever 14 or other analogous device. The coupling-head 12 is also provided with a suitable groove to receive the spline or feather 2, on which it has movement to and from the hub 5 and disk 4.

On the inner face of the disk 4, near the periphery thereof, are pairs of bearing-brackets 16, which are spaced apart from each other and receive bearing pins or bolts 17, one in each pair of brackets. Each pin 17 has a cam sleeve or member 18 movably mounted thereon between the brackets 16, and firmly attached to one end of the cam is an eccentric-strap 19, having an inwardly-projecting arm 20, movably attached to the adjacent shifting link 9, the said arm 20 being split for a portion of its length and engaged by a bolt 21 to facilitate application and securement thereof and the strap 19 to the sleeve with such positiveness as to insure movement of the sleeve in opposite directions on the pin or bolt 17 in consonance with the movement of the shifting link without the least lost motion. The arms 20 are diametrically opposed to each other, and to obtain this disposition, as well as the necessary arrangement of the shoe connections, which will be more fully hereinafter explained, the pins or bolts 17 project in reverse directions with relation to the central vertical plane of the clutch or disk 4. The disk 4 also carries oppositely-disposed segmental shoes 22, each of which has an inner fulcrum projection 23, pivotally connected to the elbow of a bell-crank lever 24, the terminal of one arm of said bell-crank lever movably engaging a fulcrum-post 25, fixed on the disk adjacent the shoe, and the terminal of the other arm of the bell-crank lever is pivotally connected to a link 26, having its opposite outer end movably attached between ears 27 of a collar 28, through which the sleeve 18 centrally projects. The links 26 from the two shoes or the bell-crank levers for the latter extend outwardly in reverse directions, and the inner terminals of the said links are attached to opposite arms of the respective bell-cranks, and the fulcrum-posts 25 for the bell-cranks are on opposite sides of the plane of the elbows or points of attachments of the latter to the shoes in relation to the respective shoes. The shoes 23 are loosely fulcrumed at one end and unattached at the opposite end, the fulcrumed and unattached ends of the opposing shoes being in reverse position. Each shoe 23 has one end formed with an opening 29, through which projects a fulcrum post or pin 30, fixed to the disk 4, the said pin or post 30 being materially less in diameter than the opening 29 to permit the shoe to have an inward movement equally throughout its length in an arc of a circle. The opposite unattached end of the shoe when the latter is drawn inwardly contacts with a stop 31, carried by the disk, and when the shoes are drawn inwardly and braced against the stops they are prevented from having loose movement, and thereby protected from wear. The loose fulcrum engagement of one end of each shoe permits an inward movement of the shoe to draw the same away equally from the part with which it coöperates. Each shoe has a segmental bearing-strip 32 secured therein and preferably composed of wood cut across the grain to expose the ends of the latter at the outer bearing edge. The clutch also includes a receptive member with which the shoes 23 coact and consisting of a disk 33, having a rim-flange 34, projecting over the disk 4 to receive the impact of the said shoes. The disk 33 projects outwardly from a hub 35, which is sleeved on a bushing 36, secured to one end thereof, as clearly shown by Fig. 2. The hub of the receptive member terminates at one end close to the hub 5 of the locking member, and the opposite end of the hub of the receptive member abuts against a stop-collar 37 to thereby hold the receptive member in positive operative relation to the locking member. The clutch thus far described will be sensitive in its operation and the shoes 23 will quickly respond to the movement of the links 9 in opposite directions to either connect or disconnect the locking and receptive members of the clutch.

To compensate for wear on the shoes, the movement of the links 26 can be increased relatively to an initial adjustment through the medium of jam-screws 38, extending through the disk 4 and bearing against the lower terminals 39 of the brackets 16, the latter having a slight pivotal movement on their pins 17ª, said pins being terminally secured in ears 40, rigidly held by the disk 4. The pins 17ª pass through the outer portions of the upper extremities of the brackets, as clearly shown by Fig. 4, the brackets being provided with arcuate projections 41, fitted in similar seats 42 in the disk 4. The pins 17 pass through the inner terminals of the upper extremities of the brackets, and from this arrangement it will be seen that when the lower terminals of the brackets are forced inwardly at an angle their upper or outer terminals will be moved in an outward direction and correspondingly draw the parts therewith which are supported thereby and move the shoes closer to the rim 34 of the disk 33. A reverse adjustment of the brackets through the medium of the jam-screws 38 may be made, if found necessary. Below the point of engagement of the jam-screw 38 with the lower or inner terminals of the brackets 16 draw-bolts 43 adjustably extend through said terminals and adjacent portions of the disk 4, said draw-bolts being arranged at an angle of inclination to render their operation more effective. The draw-bolts 43 are tightened after the jam-screws 38 have been adjusted, and thereby the said brackets are held against loose movement.

Having thus fully described the invention, what is claimed as new is—

1. In a clutch, a locking member, shoes movably held by the locking member, operating means movably connected to intermediate portions of the shoes, cams mounted upon the locking member, means for connecting the cams and said operating means, and means for moving the cams to actuate the shoes.

2. In a clutch, a receptive member, a locking member, shoes loosely fulcrumed on opposite portions of the locking member, operating means movably connected to intermediate portions of the shoes, cams mounted upon the locking member, means for connecting the cams and said operating means, and means for moving the cams to actuate the shoes.

3. In a clutch, a receptive member, a locking member, shoes movably held by the locking member, cams adjustably mounted upon the locking member, means for connecting the shoes and cams, and means for moving the cams to actuate the shoes.

4. In a clutch, a receptive member, a locking member, shoes loosely fulcrumed upon the locking member, cams adjustably mounted upon the locking member, means for connecting the shoes and cams, and means for moving the cams to actuate the shoes.

5. In a clutch, a receptive member, a locking member, shoes movably held by the locking member, operating means movably connected to intermediate portions of the shoes, brackets pivotally mounted upon the locking member, means for adjusting said brackets, cams carried by the brackets, means for connecting the cams and said operating means, and means for moving the cams to actuate the shoes.

6. In a clutch, a receptive member, a locking member, shoes carried by the locking member, cams mounted upon the locking member, bell-crank levers mounted upon the locking member and having connection with the shoes, means for connecting the bell-crank levers and cams, and means for moving the cams to actuate the shoes.

7. In a clutch, a receptive member, a locking member, shoes carried by the locking member, carrying members adjustably secured to said locking member, cams mounted on said carrying member, means for connecting the cams and shoes, and means for moving the cams to actuate the shoes.

8. In a clutch, a receptive member, a locking member, shoes movably held by the locking member, bell-crank levers having intermediate portions movably attached to the shoes and their terminals fulcrumed on the locking member, cams mounted upon the locking member, means for connecting the cams and bell-crank levers, and means for moving the cams to actuate the shoes.

9. In a clutch, a receptive member, a locking member, shoes loosely fulcrumed at one end of each to the locking member and having their opposite ends free for movement, bell-crank levers attached to intermediate portions of the shoes, arms having eccentric connection with relation to the bell-crank levers, and means for actuating the said arms.

10. In a clutch, a receptive member, a locking member, shoes movably held by the locking member, operating means movably connected to intermediate portions of the shoes, arms having an eccentric attachment to said means, and devices for actuating the said arms.

11. In a clutch, a receptive member, a locking member, shoes movably held by the locking member, bell-crank levers having intermediate portions movably attached to the shoes and terminals fulcrumed on the locking member, links extending outwardly from the bell-crank levers, arms having an eccentric connection with relation to the links, and means for operating said arms.

12. In a clutch, a receptive member, a locking member, shoes loosely fulcrumed on opposite portions of the locking member, outwardly-extending links movably connected to intermediate portions of the shoes, collars movably secured to the outer ends of the links, eccentrically-mounted sleeves engaged by said collars, arms secured to said sleeves, and means for actuating the said arms.

13. In a clutch, a receptive member, a locking member, shoes carried by the locking member, bell-crank levers carried by the locking member and having connection with the shoes, links connected to the bell-crank levers, brackets pivotally mounted upon the locking member, means for adjusting said brackets, cams carried by the brackets, means for connecting the links and cams, eccentric-straps secured to said cams, a movable member, and means for connecting the straps to said movable member.

14. In a clutch, a receptive member, a locking member, shoes movably held by the locking member, bell-crank levers having intermediate portions movably attached to the shoes and their terminals fulcrumed on the locking member, cams adjustably mounted upon the locking member, means for connecting the cams and bell-crank levers, and means for moving the cams to actuate the shoes.

15. In a clutch, a receptive member, a locking member, shoes movably held by the locking member, bell-crank levers having intermediate portions movably attached to the shoes and their terminals fulcrumed on the locking member, brackets pivotally mounted upon the locking member, means for adjusting said brackets, cams carried by the brackets, means for connecting the bell-crank levers and cams, and means for moving the cams to operate the bell-crank levers.

In testimony whereof I affix my signature in presence of two witnesses.

CHARLES A. FISHER

Witnesses:
JOHN L. FLETCHER,
CHAS. S. HYER.